(12) United States Patent
Ueyama et al.

(10) Patent No.: US 8,669,527 B2
(45) Date of Patent: Mar. 11, 2014

(54) SCINTILLATOR HAVING PHASE SEPARATION STRUCTURE AND RADIATION DETECTOR USING THE SAME

(71) Applicant: Canon Kabushiki Kaisha, Tokyo (JP)

(72) Inventors: Ryoko Ueyama, Kawasaki (JP); Nobuhiro Yasui, Yokohama (JP); Yoshihiro Ohashi, Tokyo (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/048,637

(22) Filed: Oct. 8, 2013

(65) Prior Publication Data

US 2014/0034839 A1    Feb. 6, 2014

Related U.S. Application Data

(62) Division of application No. 13/540,948, filed on Jul. 3, 2012, now Pat. No. 8,586,931.

(30) Foreign Application Priority Data

Jul. 12, 2011    (JP) .................................. 2011-153962

(51) Int. Cl.
*G01T 1/10*    (2006.01)
(52) U.S. Cl.
USPC ..................................................... 250/361 R
(58) Field of Classification Search
USPC ..................................................... 250/361 R
See application file for complete search history.

(56) References Cited

U.S. PATENT DOCUMENTS

| | | | |
|---|---|---|---|
| 6,214,738 B1 | 4/2001 | Aiba et al. | |
| 6,541,386 B2 | 4/2003 | Aiba et al. | |
| 7,446,330 B2 | 11/2008 | Takasu | |
| 8,440,983 B2 * | 5/2013 | Yanagita et al. | 250/458.1 |
| 2011/0223323 A1 | 9/2011 | Ohashi et al. | |
| 2012/0248317 A1 | 10/2012 | Ohashi et al. | |
| 2013/0026374 A1 | 1/2013 | Saito et al. | |

FOREIGN PATENT DOCUMENTS

JP    2008-145335 A    6/2008

* cited by examiner

*Primary Examiner* — Kiho Kim
(74) *Attorney, Agent, or Firm* — Fitzpatrick, Cella, Harper & Scinto

(57) ABSTRACT

Provided is a scintillator used for detecting radiation in an X-ray CT scanner or the like, the scintillator having a unidirectional phase separation structure having an optical waveguide function, which eliminates the need of formation of partition walls for preventing crosstalks. The scintillator has the phase separation structure including: a first crystal phase including multiple columnar crystals having unidirectionality; and a second crystal phase filling space on the side of the first crystal phase. The second crystal phase includes a material represented by $Cs_3Cu_2[X_aY_{1-a}]_5$, where X and Y are elements which are different from each other and which are selected from the group consisting of I, Br, and Cl, and $0 \leq a \leq 1$ is satisfied.

18 Claims, 7 Drawing Sheets

*FIG. 3A* *FIG. 3B*
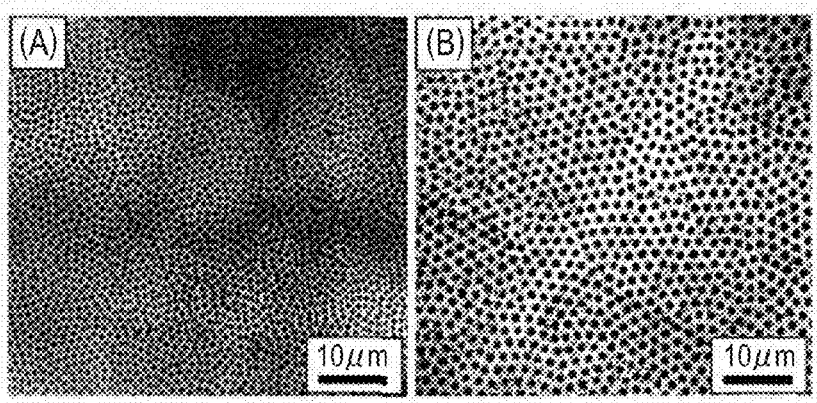
*FIG. 3C* *FIG. 3D*
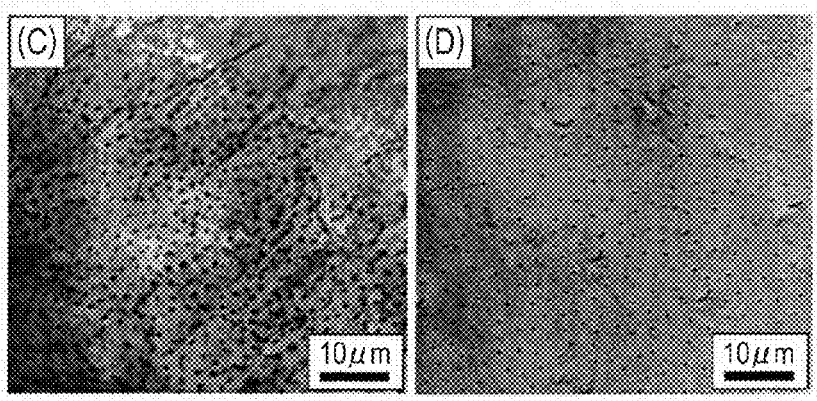
*FIG. 3E* *FIG. 3F* *FIG. 3G*
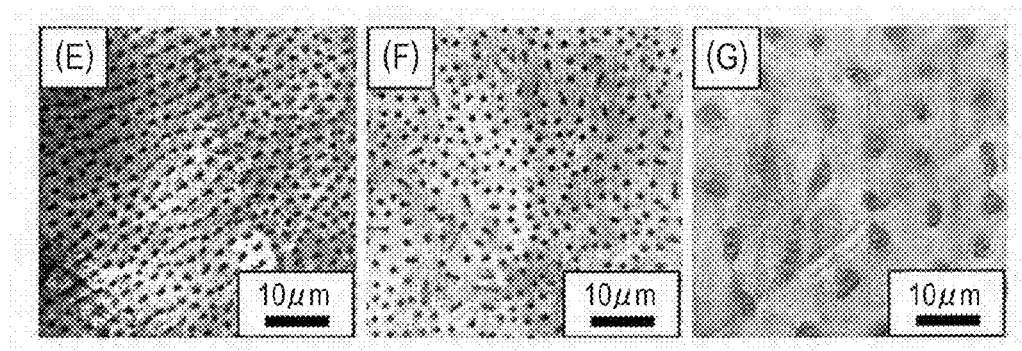

ed. In Japanese Patent Application Laid-Open No. 2008-145335, multiple scintillator crystals are joined to one another with an adhesive to form a scintillator array 70, the adhesive is etched out thereafter, and a gap formed by the etching is filled with titanium oxide powder as a partition wall material (FIG. 7). It is disclosed that, in this case, the thickness of partition walls 71 may be reduced as small as about 1 μm.

However, the partitions walls 71 disclosed in Japanese Patent Application Laid-Open No. 2008-145335 may be formed so as to be thin, but cannot be eliminated. Further, the manufacturing step takes a lot of time and effort, including cutting of the scintillator and joining of the scintillator crystals for forming the partition walls.

SUMMARY OF THE INVENTION

The present invention has been made to solve the above-mentioned problem, and has an object to impart an optical waveguide function to a scintillator itself, in order to radically solve the problem that partition walls to be scattering planes or reflection planes are necessary because the optical waveguide function is not conventionally imparted to the scintillator itself.

In view of the above, according to the present invention, there is provided a scintillator having a phase separation structure including: a first crystal phase including multiple columnar crystals having unidirectionality; and a second crystal phase filling space on a side of the first crystal phase, in which: the second crystal phase includes a material represented by $Cs_3Cu_2[X_aY_{1-a}]_5$, where X and Y are elements which are different from each other and which are selected from the group consisting of I, Br, and Cl, and $0 \leq a \leq 1$ is satisfied; and the second crystal phase emits light when being excited by radiation.

Further, according to the present invention, there is provided a radiation detector including a scintillator and a photodetector, the scintillator having a phase separation structure, the phase separation structure including: a first crystal phase including multiple columnar crystals having unidirectionality; and a second crystal phase filling space on a side of the first crystal phase, in which: the second crystal phase includes a material represented by $Cs_3Cu_2[X_aY_{1-a}]_5$, where X and Y are elements which are different from each other and which are selected from the group consisting of I, Br, and Cl, and $0 \leq a \leq 1$ is satisfied; and the second crystal phase emits light when being excited by radiation, the scintillator being placed on the photodetector one of directly and with a protective layer therebetween.

The scintillator according to the present invention has the phase separation structure having unidirectionality and including two phases, and the optical waveguide function may be imparted to the scintillator itself. Therefore, the conventional manufacturing step including cutting of the scintillator and forming partition walls may be eliminated, and the radiation detector may be manufactured only by placing the scintillator according to the present invention on the photodetector.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G, 3H, 3I, 3J, 3K, and 3L are optical transmission images of the scintillator according to the present invention.

DESCRIPTION OF THE EMBODIMENTS

Exemplary embodiments of the present invention are described in the following with reference to the attached drawings.

(Structure of Scintillator)

Figure 1:
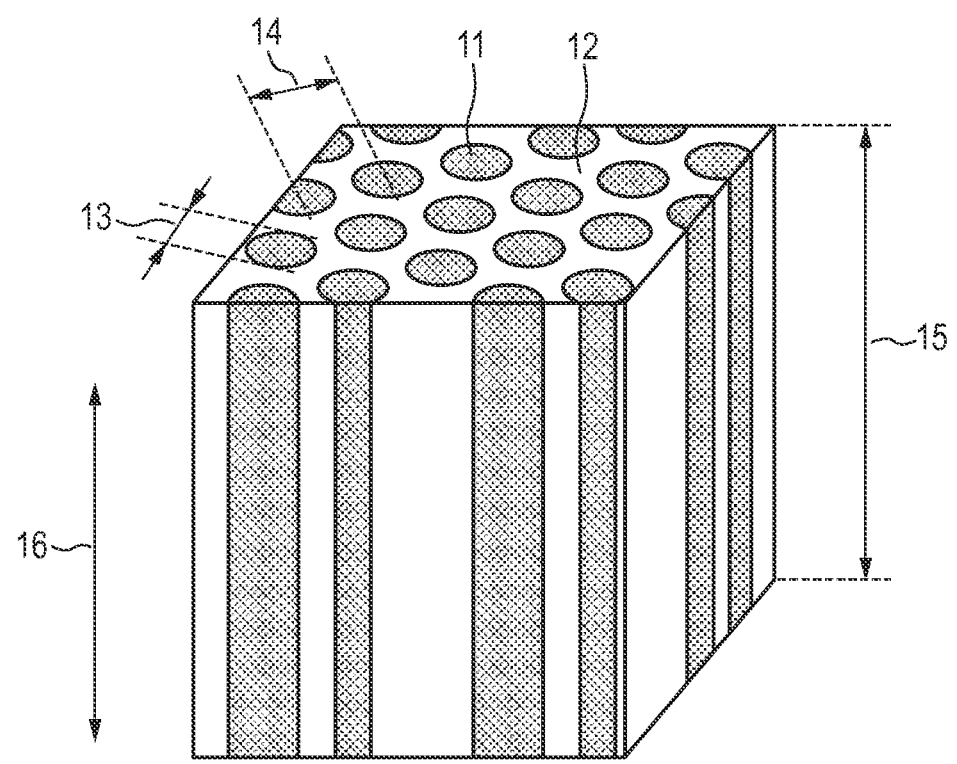
FIG. 1 is a schematic view illustrating a scintillator according to the present invention.

FIG. 1 illustrates a schematic structure of a scintillator according to the present invention.

The scintillator having a phase separation structure according to the present invention, includes two crystal phases of a first crystal phase 11 including multiple columnar crystals having unidirectionality and a second crystal phase 12 filling space on the side of the first crystal phase 11. The second crystal phase includes a material represented by $Cs_3C_2[X_aY_{1-a}]_5$, where X and Y are elements, which are different from each other and are selected from the group consisting of I, Br, and Cl, and "a" is in a range of 0 or more to 1 or less ($0 \leq a \leq 1$). In this case, it is preferred that 90 wt % or more to 100 wt % or less of the second crystal phase be $Cs_3Cu_2[X_aY_{1-a}]_5$, and it is more preferred that 100 wt % of the second crystal phase be $Cs_3Cu_2[X_aY_{1-a}]_5$. The shape of the columnar crystals which form the first crystal phase 11 is not limited to a cylinder, and may include multiple crystal faces and may be in a shape of a polygonal prism. It is preferred that a diameter 13 of the columnar crystals be in the range of 50 nm or more to 30 μm or less. Further, it is preferred that a period 14 between adjacent columnar crystals be in the range of 500 nm or more to 50 μm or less. However, when the scintillator according to the present invention and a detector or a detector array are used in combination, it is preferred that structures, which are sized so that a large number of columnar crystals are arranged on a light receiving region of a photodetector, be used in combination. For example, when the light receiving region is in the shape of a square of 20 μm per side, the columnar crystals are sized so that, for example, the diameter thereof is 5 μm and the period between adjacent columnar crystals is 8 μm. Therefore, it is preferred to combine structures having a small size in accordance with the size of the light receiving region, irrespective of the above-mentioned ranges of the structure sizes. Further, the ranges of the sizes of the structures are determined by the selection of a material system and conditions in manufacture, and a tendency is described below.

Further, although partly depending on the manufacturing method, a thickness 15 of the scintillator can be adjusted to be an arbitrary thickness. It is preferred that the scintillator be substantially straightly continuous in a thickness direction 16 of the columnar crystals, but the present invention does not exclude cases where a columnar crystal is discontinuous midway, a columnar crystal branches, multiple columnar crystals become one, the diameter of a columnar crystal fluctuates, a columnar crystal is not straight and a bent portion is included, and the like. Through appropriate control of the direction of a solidification interface, it is also possible to bend a columnar crystal on purpose. FIG. 1 is only a schematic view, and by no means limits the present invention.

In a first embodiment, it is preferred that the first crystal phase include a material selected from the group consisting of sodium chloride (NaCl), sodium bromide (NaBr), sodium iodide (NaI), and potassium chloride (KCl). It is more preferred that the first crystal phase include KCl. It is preferred that 90 wt % or more to 100 wt % or less of the first crystal phase be NaCl or the like, and it is more preferred that 100 wt % of the first crystal phase be NaCl or the like. Further, it is preferred that the second crystal phase include $Cs_3Cu_2I_5$. In this case, it is preferred that 90 wt % or more to 100 wt % or less of the second crystal phase be $Cs_3Cu_2I_5$, and it is more preferred that 100 wt % of the second crystal phase be $Cs_3Cu_2I_5$. Preferred composition ratios in the above-mentioned selection of the material system are shown in Table 1.

TABLE 1

| First Crystal Phase:Second Crystal Phase | Eutectic Composition [mol %] |
|---|---|
| $NaCl:Cs_3Cu_2I_5$ | 24:76 |
| $NaBr:Cs_3Cu_2I_5$ | 36:64 |
| $NaI:Cs_3Cu_2I_5$ | 56:44 |
| $KCl:Cs_3Cu_2I_5$ | 47:53 |

Further, in a second embodiment, it is preferred that the first crystal phase include a material selected from the group consisting of potassium bromide (KBr), sodium bromide (NaBr), rubidium bromide (RbBr), sodium chloride (NaCl), and potassium chloride (KCl). Further, it is preferred that the second crystal phase include a material represented by $Cs_3Cu_2[X_aY_{1-a}]_5$, where X and Y are elements which are different from each other and which are selected from the group consisting of I, Br, and Cl and "a" is in a range of 0 or more to 1 or less ($0 \leq a \leq 1$). In this case, it is preferred that 90 wt % or more to 100 wt % or less of the second crystal phase be $Cs_3Cu_2[X_aY_{1-a}]_5$, and it is more preferred that 100 wt % of the second crystal phase be $Cs_3Cu_2[X_aY_{1-a}]_5$. A case where the second crystal phase includes a material represented by $Cs_3Cu_2(Br_aI_{1-a})_5$, where $0 \leq a \leq 1$ is satisfied, and a case where the second crystal phase includes a material represented by $Cs_3C_2(Cl_aI_{1-a})_5$, where $0.71 \leq a \leq 0.79$ is satisfied, are also within the scope of the present invention. Preferred composition ratios in the above-mentioned selection of the material system are shown in Table 2.

TABLE 2

| First Crystal Phase:Second Crystal Phase | Eutectic Composition [mol %] |
|---|---|
| $KBr:Cs_3Cu_2Br_5$ | 50:50 |
| $NaBr:Cs_3Cu_2Br_5$ | 27:73 |
| $RbBr:Cs_3Cu_2Br_5$ | 56:44 |
| $KBr:Cs3Cu_2Br_{2.5}I_{2.5}$ | 36:64 |
| $NaBr:Cs3Cu_2Br_{2.5}I_{2.5}$ | 65:35 |
| $KCl:Cs3Cu_2Cl_{3.75}I_{1.25}$ | 30:70 |
| $NaCl:Cs3Cu_2Cl_{3.75}I_{1.25}$ | 17:83 |
| $KBr:Cs_3Cu_2I_5$ | 62:38 |

In order to obtain a satisfactory separation structure as illustrated in the schematic view of FIG. 1, it is preferred to use approximately the composition ratios shown in Tables 1 and 2. The compositions correspond to eutectic points. However, it does not mean that any deviation from the above composition ratios is unacceptable. A range of ±5 mol % with respect to the composition ratios shown in Tables 1 and 2 is within tolerance. Conditions which determine the tolerance with respect to the composition ratios are that, in forming the structure, the phases are in a eutectic relationship with each other, and that, around the eutectic compositions, by carrying out unidirectional solidification, a good quality structure as illustrated in FIG. 1 may be obtained. When the composition ratio is out of the above-mentioned ranges, that is, when the deviation is more than 5 mol %, one of the phases deposits first, which is a cause of disturbing the structure from the viewpoint of forming the structure.

A material other than the above-mentioned materials may be added to the first and second crystal phases. In particular, it is preferred that a material to be added to the first crystal phase 11 be a material which is dissolved in the first crystal phase 11 and is not dissolved in the second crystal phase 12 in additive composition. For example, NaBr may be added to NaCl.

In the phase separation structure according to the present invention, when $Cs_3Cu_2I_5$ which is a scintillator material is used in the second crystal phase 12, radiation applied thereto excites $Cs_3Cu_2I_5$ to cause light emission. According to the present invention, it is preferred that the second crystal phase 12 which is formed of $Cs_3Cu_2I_5$ having a higher refractive index than that of the first crystal phase 11 emit light, but both of the first and second crystal phases may emit light.

An optical waveguide property is an important property of the scintillator having unidirectionality according to the present invention. Refractive indices of the material system forming the above-mentioned first crystal phase 11 and second crystal phase 12 are shown in Table 3.

TABLE 3

| Material System | Refractive Index of First Crystal Phase | Refractive Index of Second Crystal Phase |
|---|---|---|
| $NaI—Cs_3Cu_2I_5$ | 1.77 | 1.8 or more |
| $NaBr—Cs_3Cu_2I_5$ | 1.64 | 1.8 or more |

TABLE 3-continued

| Material System | Refractive Index of First Crystal Phase | Refractive Index of Second Crystal Phase |
| --- | --- | --- |
| NaCl—Cs$_3$Cu$_2$I$_5$ | 1.55 | 1.8 or more |
| KCl—Cs$_3$Cu$_2$I$_5$ | 1.49 | 1.8 or more |

The refractive indices shown in Table 3 are not severe values because the refractive indices depend on the wavelength and vary by an additive, and Table 3 merely shows that the refractive indices of the constituent materials differ from each other (the refractive index of Cs$_3$Cu$_2$I$_5$ is assumed to be 1.8 or more although there is no value specified in literature, because there is a clear contrast between NaI and Cs$_3$Cu$_2$I$_5$ in NaI—Cs$_3$Cu$_2$I$_5$).

Further, in the phase separation structure according to the present invention, when Cs$_3$Cu$_2$[X$_a$Y$_{1-a}$]$_5$ which is a scintillator material is used in the second crystal phase 12, radiation applied thereto excites Cs$_3$Cu$_2$[X$_a$Y$_{1-a}$]$_5$ to emit light. According to the present invention, it is preferred that the second crystal phase 12 which is formed of Cs$_3$Cu$_2$[X$_a$Y$_{1-a}$]$_5$ having a higher refractive index than that of the first crystal phase 11 emit light, but both of the first and second crystal phases may emit light.

The optical waveguide property is an important property of the scintillator having unidirectionality according to the present invention. Refractive indices of the material system forming the above-mentioned first crystal phase 11 and second crystal phase 12 are shown in Table 4.

TABLE 4

| Material System | Refractive Index of First Crystal Phase | Refractive Index of Second Crystal Phase |
| --- | --- | --- |
| KBr—Cs$_3$Cu$_2$Br$_5$ | 1.55 | 1.7 or more |
| NaBr—Cs$_3$Cu$_2$Br$_5$ | 1.64 | 1.7 or more |
| RbBr—Cs$_3$Cu$_2$Br$_5$ | 1.55 | 1.7 or more |
| KCl—Cs$_3$Cu$_2$Cl$_{3.75}$I$_{1.25}$ | 1.49 | 1.7 or more |
| NaCl—Cs$_3$Cu$_2$Cl$_{3.75}$I$_{1.25}$ | 1.55 | 1.7 or more |
| KBr—Cs$_3$Cu$_2$Br$_{2.5}$I$_{2.5}$ | 1.55 | 1.7 or more |
| NaBr—Cs$_3$Cu$_2$Br$_{2.5}$I$_{2.5}$ | 1.64 | 1.7 or more |
| KBr—Cs$_3$Cu$_2$I$_5$ | 1.55 | 1.8 or more |

The refractive indices shown in Table 3 are not severe values because the refractive indices depend on the wavelength and vary by an additive, and Table 4 merely shows that the refractive indices of the constituent materials differ from each other (the refractive index of Cs$_3$Cu$_2$Br$_5$ is assumed to be 1.7 or more although there is no value specified in literature, because there is a clear contrast between KBr and Cs$_3$Cu$_2$Br$_5$ in KBr—Cs$_3$Cu$_2$Br$_5$).

According to Snell's law, between materials having different refractive indices, when light enters a low refractive index medium from a high refractive index medium at a certain angle, the light is totally reflected. When the angle becomes wider, reflection and refraction are caused. Therefore, in the scintillator according to the present invention, the fact that there are refractive index ratios shown in Table 2 and Table 3 indicates a situation in which light does not disperse due to the total reflection in the high refractive index medium. More specifically, the high refractive index medium relatively confines more light therein and propagates more light therethrough, repeating refraction and reflection. Therefore, it is highly desired that the refractive index ratio (=low refractive index crystal phase/high refractive index crystal phase) be smaller than 1. Taking only the total reflection conditions into consideration, as the ratio of low refractive index crystal phase/high refractive index crystal phase becomes smaller, light is less liable to disperse. It can be seen from Table 2 and Table 3 that the ratios to Cs$_3$Cu$_2$I$_5$ are KCl<(KBr=NaCl) <NaBr<NaI. In this case, particularly in the present invention, Cs$_3$Cu$_2$I$_5$ which is the high refractive index medium forms the second crystal phase 12, that is, a matrix around the columnar crystals. Thus, when the composition ratio of the first crystal phase 11 which forms the columnar crystals (see Table 1) is lower (for example, NaCl is 24 mol % while NaI is 56 mol %), the volume ratio of the columnar crystals becomes lower, and there is a tendency that light is liable to disperse through the sides of the columnar crystals. For example, the volume ratios of the material systems according to the present invention are, based on calculation using samples manufactured in examples described below, NaI (45 vol %), KCl (38 vol %), KBr (35 vol %), NaBr (17 vol %), and NaCl (4 vol %) in descending order. Therefore, this is a trade-off between the refractive index ratio and the volume ratio. From the viewpoint of optical waveguiding, it is more preferred that, among the above-mentioned four kinds of material systems, KCl form the first crystal phase 11.

Further, it can be seen that, from Table 4, among the Cs$_3$Cu$_2$Br$_5$ systems, the ratios to Cs$_3$Cu$_2$Br$_5$ are KBr, RbBr<NaBr. In this case, particularly in the present invention, Cs$_3$Cu$_2$Br$_5$ which is the high refractive index medium forms the second crystal phase 12, that is, a matrix around the columnar crystals. Thus, when the composition ratio of the first crystal phase 11 which forms the columnar crystals (see Table 2) is lower (for example, NaBr is 27 mol % while RbBr is 56 mol %), the volume ratio of the columnar crystals becomes lower, and there is a tendency that light is liable to disperse through the sides of the columnar crystals. For example, the volume ratios of the material systems according to the present invention are, in the Cs$_3$Cu$_2$Br$_5$ systems, RbBr (40 vol %), KBr (20 vol %), and NaBr (9 vol %) in descending order. Therefore, this is a trade-off between the refractive index ratio and the volume ratio. From the viewpoint of optical waveguiding, it is more preferred that, among the above-mentioned three kinds of material systems, RbBr form the first crystal phase 11.

Further, it can be seen that, from Table 4, among the Cs$_3$Cu$_2$Br$_{2.5}$I$_{2.5}$ systems, the ratios to Cs$_3$Cu$_2$Br$_{2.5}$I$_{2.5}$ are KBr<NaBr. In this case, particularly in the present invention, Cs$_3$Cu$_2$Br$_{2.5}$I$_{2.5}$ which is the high refractive index medium forms the second crystal phase 12, that is, a matrix around the columnar crystals. Thus, when the composition ratio of the first crystal phase 11 which forms the columnar crystals (see Table 3) is lower (for example, KBr is 36 mol % while NaBr is 65 mol %), the volume ratio of the columnar crystals becomes lower, and there is a tendency that light is liable to disperse through the sides of the columnar crystals. For example, the volume ratios of the material systems according to the present invention are, based on calculation using samples manufactured in examples described below, in the Cs$_3$Cu$_2$Br$_{2.5}$I$_{2.5}$ systems, NaBr (38 vol %) and KBr (12 vol %) in descending order. Therefore, this is a trade-off between the refractive index ratio and the volume ratio. From the viewpoint of optical waveguiding, it is more preferred that, among the above-mentioned two kinds of material systems, NaBr form the first crystal phase 11.

Further, it can be seen that, from Table 4, among the Cs$_3$Cu$_2$Cl$_{3.75}$I$_{1.25}$ systems, the ratios to Cs$_3$Cu$_2$Cl$_{375}$I$_{1.25}$ are KCl<NaCl. In this case, particularly in the present invention, Cs$_3$Cu$_2$Cl$_{3.75}$I$_{1.25}$ which is the high refractive index medium forms the second crystal phase 12, that is, a matrix around the columnar crystals. Thus, when the composition ratio of the first crystal phase 11 which forms the columnar crystals (see Table 3) is lower (for example, NaCl is 17 mol % while KCl is 30 mol %), the volume ratio of the columnar crystals becomes lower, and there is a tendency that light is liable to disperse through the sides of the columnar crystals. For example, the volume ratios of the material systems according to the present invention are, based on calculation using samples manufactured in examples described below, in the $Cs_3Cu_2Cl_{3.75}I_{1.25}$ systems, KCl (12 vol %) and NaCl (8 vol %) in descending order. Therefore, this is a trade-off between the refractive index ratio and the volume ratio. From the viewpoint of optical waveguiding, it is more preferred that, among the above-mentioned two kinds of material systems, KCl form the first crystal phase 11.

However, evaluation should be made with regard to the respective applications while taking into consideration, for example, luminous efficiency by radiation excitation, and the quality is not determined only from the refractive index ratio and the composition ratio. Therefore, there is no doubt that all material systems are important.

According to the present invention, it is preferred to use, as the second crystal phase, $Cs_3Cu_2I_5$. $Cs_3Cu_2Br_5$, $Cs_3Cu_2Br_{2.5}I_{2.5}$, and $Cs_3Cu_2Cl_{3.75}I_{1.25}$ the refractive indices of which are particularly high. This may cause the refractive index ratio of the first crystal phase to be large, and thus, light emitted by $Cs_3Cu_2I_5$, $Cs_3Cu_2Br_5$, $Cs_3Cu_2Br_{2.5}I_{2.5}$, and $Cs_3Cu_2Cl_{3.75}I_{1.25}$ when radiation is applied thereto may be propagated efficiently. Therefore, compared with a combination of materials in which the refractive index ratio of first crystal phase/second crystal phase is larger than 0.8, the amount of light emission which reaches immediately below increases. Further, dispersion of the light is suppressed, and thus, the spatial resolution may be enhanced.

As described above, the scintillator according to the present invention is characterized by its property of achieving waveguiding of light in a direction parallel to the columnar crystals and not achieving waveguiding of light by scattering, reflection, and the like in a direction perpendicular to the columnar crystals. Therefore, crosstalks between light beams may be suppressed without providing partition walls in single crystals as in the conventional case.

(Manufacture of Scintillator)

The method of manufacturing the scintillator according to the present invention may be arbitrary insofar as the desired material systems with optimum composition are molten and solidified so as to have unidirectionality. In particular, the temperature gradient is required to be controlled so that the liquid-solid interface is flat, and it is preferred that the temperature gradient be about 30° C./mm or higher. However, in order to eliminate cracks in the crystals and the like due to thermal stress, the temperature gradient may be lowered to the extent that there is no harm in forming the above-mentioned structure. Further, it is also desirable to suppress cracks and the like by reheating already formed crystals to the extent that the crystals are not molten. Further, as described above, the composition range which enables forming the eutectic structure is (eutectic composition)±5 mol %. There is a correlation among this range, the temperature gradient, and the solidification rate, which is inherent in the material systems. It is suggested that the crystals according to the present invention should be manufactured in a so-called coupled eutectic zone.

Figure 2A:
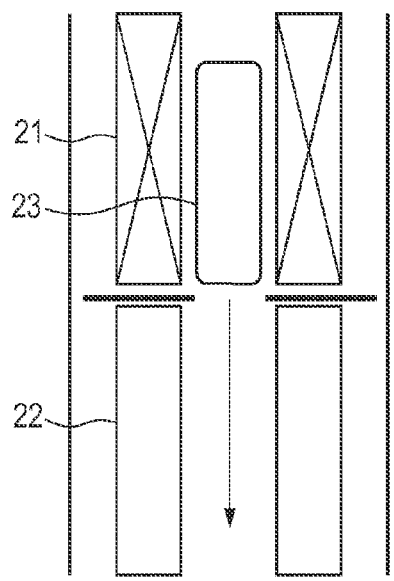
FIGS. 2A and 2B are schematic views illustrating exemplary apparatus for manufacturing the scintillator according to the present invention.
Figure 2B:
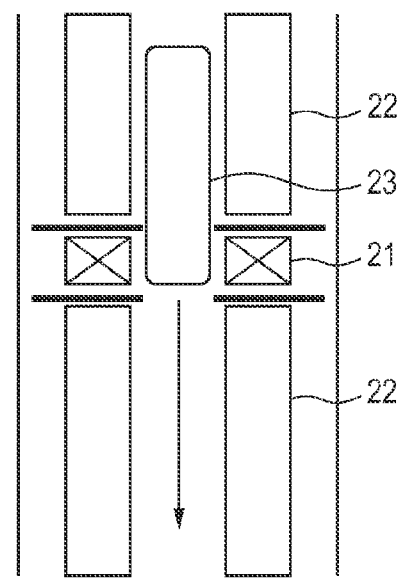

As illustrated in FIGS. 2A and 2B, in the Bridgman technique used in an apparatus for manufacturing the scintillator, a sample material enclosed in a cylindrical quartz tube or the like so as to prevent oxidation is vertically placed. A heater or the sample is moved at a fixed rate, and thus the position of the solidification interface may be controlled. In this manner, the scintillator according to the present invention may be manufactured. In particular, as illustrated in FIG. 2A, the apparatus includes a heater portion 21 the length of which is equivalent to the length of a sample 23, and a water cooling portion 22 for achieving the temperature gradient of 30° C./mm at the liquid-solid interface. Further, as illustrated in FIG. 2B, the structure may be such that the water cooling portion 22 is provided both at the top and at the bottom and the heater portion 21 covers only a part of the sample 23. A manufacturing method which includes means equivalent to those is also possible.

The scintillator may also be similarly manufactured by pulling upward a crystal from a molten liquid as in the Czochralski process. In this case, differently from the case of the Bridgman technique in which the sample is solidified in a container, the liquid-solid interface may be formed without being affected by the wall surface of the container, which may be regarded as more preferred. Further, the scintillator may also be manufactured by the floating zone method.

In particular, in the Bridgman technique, the solidification rate is required to be set so that the liquid-solid interface of the sample is as flat as possible. However, heat is exchanged mainly through the side of the sample, and thus, the optimum solidification rate depends on the diameter of the sample. More specifically, when the diameter of the sample is large, it takes time for heat to be exchanged, and thus, when the solidification rate is not low, the liquid-solid interface is considerably curved, and the formed columnar crystals of the first crystal phase 11 are bent in almost all the regions of the sample. This is because the direction of growth of the columnar crystals is substantially perpendicular to the liquid-solid interface. Further, when the solidification rate is further higher in relation to the size of the sample, not only the liquid-solid interface is not flat but also the liquid-solid interface cannot be kept smooth, and microroughness accompanied with dendrites is caused. It is also important to avoid such a situation. Accordingly, it is preferred that a sufficient temperature gradient of the liquid-solid interface be secured, and at the same time, the solidification rate be 850 mm/h or lower. The solidification rate is more preferably 500 mm/h or lower and further preferably 300 mm/h or lower.

Further, the diameter and the period of the first crystal phase 11 of the scintillator depend on the solidification rate. In particular, with regard to the period of the columnar crystals, the following correlation is found: $\lambda^2 \cdot v$ equals constant, where $\lambda$ is the period and $v$ is the solidification rate. Therefore, a desired period in the structure necessarily roughly limits the solidification rate. On the other hand, the manufacturing method limits the solidification rate which enables control of the liquid-solid interface so as to be flat and smooth. Therefore, the period $\lambda$ is in the range of 500 nm or more to 50 μm or less. The diameter of the columnar crystals is in the range of 50 nm or more to 30 μm or less accordingly.

In this case, a section of the columnar crystals is not circular in some cases. When the section has an indefinite shape, the smallest diameter is in the above-mentioned range. Further, it is preferred that the ratio of the largest diameter to the smallest diameter of the large number of columnar crystals on average be 10 or smaller. When the ratio is larger than 10, a lamella structure is appropriate. However, even when the ratios of some of the multiple columnar crystals are larger than 10, if the average is 10 or smaller, the case is within tolerance. Further, in terms of the manufacturing conditions, the lamella structure is more liable to be formed as the molar ratio of the material systems of the two phases is nearer to 1:1, and thus, it is preferred that the manufacturing conditions and an additive be selected so that not a lamella structure but the columnar structure as illustrated in FIG. 1 is formed.

Finally, initial (feed) composition of the raw materials of samples to be manufactured is described. The composition ratios of the above-mentioned scintillator are shown in Table 1. With regard to the initial composition, the deviation may be more than ±5 mol %. More specifically, in the Bridgman technique, by causing the solidification to be carried out so as to be unidirectional from a state in which the entire sample is molten, the material which deviates from the eutectic composition is deposited first in an early stage of the solidification, and the remaining molten liquid has the eutectic composition. In the Czochralski process, the material which deviates from the eutectic composition is pulled up in an early stage of pulling up, and thus, it is also preferred to pull up the crystal once and to, after the molten liquid has the eutectic composition, pull up the crystal again. After the crystal is manufactured, an unnecessary portion may be cut off.

(Application of Scintillator)

The scintillator according to the present invention in combination with a photodetector may be used as a radiation detector for medical care, for industrial use, for high-energy physics, and for space use. In particular, the scintillator has the optical waveguide function without partition walls or the like provided therein, and thus, it is preferred to use the scintillator in a situation in which waveguiding of light is required to be achieved in a specific direction toward a detector. Further, the scintillator is also effective in being used in an X-ray CT scanner where formation of partition walls is necessary or being used as a substitute for a CsI needle crystal in an X-ray flat panel detector (FPD). In this case, it is also possible to make an adjustment through adding another material or adding a luminescent center to a base material of the scintillator so as to conform to the light receiving sensitivity property of the detector.

Further, in addition to directly providing the scintillator according to the present invention on the detector, it is also preferred to join or place the scintillator according to the present invention via one or more protective layers or a film or a layer having an antireflective function or the like.

Example 1

This example relates to manufacture of the scintillator according to the present invention.

First, powder mixtures including 24 mol % of NaCl, mol % of NaBr, 56 mol % of NaI, and 47 mol % of KCl, respectively, with reference to $Cs_3Cu_2I_5$ were prepared. Each of the powder mixtures was enclosed in a vacuum quartz tube to be a sample. Then, the samples were introduced into a Bridgman furnace as illustrated in the schematic view of FIG. 2A, and the temperature was raised to 800° C. After the samples were entirely molten, the state was held for 30 minutes. Then, the respective samples were pulled down to carry out the solidification gradually from the bottom of the samples. Further, the samples were caused to enter a region of the furnace in which cooling water circulated when the samples were pulled down, and thus, the temperature gradient from the molten portion was caused to be 30° C./mm or larger. The four kinds of samples which were manufactured in this way were cut, and the structures thereof were observed under a transmitted light optical microscope. The result was as follows. The structure of a surface perpendicular to the direction of solidification of the $Cs_3Cu_2I_5$—KCl system was satisfactory as shown in FIG. 3A. Similarly, the structures of surfaces perpendicular to the direction of solidification of $Cs_3Cu_2I_5$—NaI, $Cs_3Cu_2I_5$—NaBr, and $Cs_3Cu_2I_5$—NaCl systems were satisfactory as shown in FIGS. 3B, 3C, and 3D, respectively.

These samples were also observed under a scanning electron microscope (SEM). It was confirmed that the columnar crystals extended long in a direction parallel to the direction of solidification. Further, composition analysis attached to the SEM made it clear that the columnar crystals in the samples were formed of KCl, NaI, NaBr, and NaCl, respectively, which were surrounded by $Cs_3Cu_2I_5$. In this way, it was confirmed that a structure in which a large number of columnar crystals had unidirectionality and the large number of columnar crystals were surrounded by $Cs_3Cu_2I_5$ may be formed. Further, FIGS. 3A to 3L show images using transmitted light, and thus, the region of $Cs_3Cu_2I_5$ of the high refractive index medium was observed to be brighter, and it was confirmed that optical waveguiding was achieved as expected.

In these four kinds of samples, with regard to the volume ratio of the columnar crystals to the $Cs_3Cu_2I_5$ portion, the volume ratio of NaI of the $Cs_3Cu_2I_5$—NaI system was about 45 vol %, the volume ratio of KCl of the $Cs_3Cu_2I_5$—KCl system was about 38 vol %, the volume ratio of NaBr of the $Cs_3Cu_2I_5$—NaBr system was about 17 vol %, and the volume ratio of NaCl of the $Cs_3Cu_2I_5$—NaCl system was about 4 vol %. It was made clear that, in this way, the volume ratio varies depending on the material systems. From the viewpoint of optical waveguiding, material systems including NaI or KCl having a high volume ratio are more preferred. However, the effect of the volume ratio is adverse from the viewpoint of absorbing X-rays. The above-mentioned preference is only from the viewpoint of optical waveguiding, and suitable material systems may be selected appropriately depending on the application.

Figure 4:
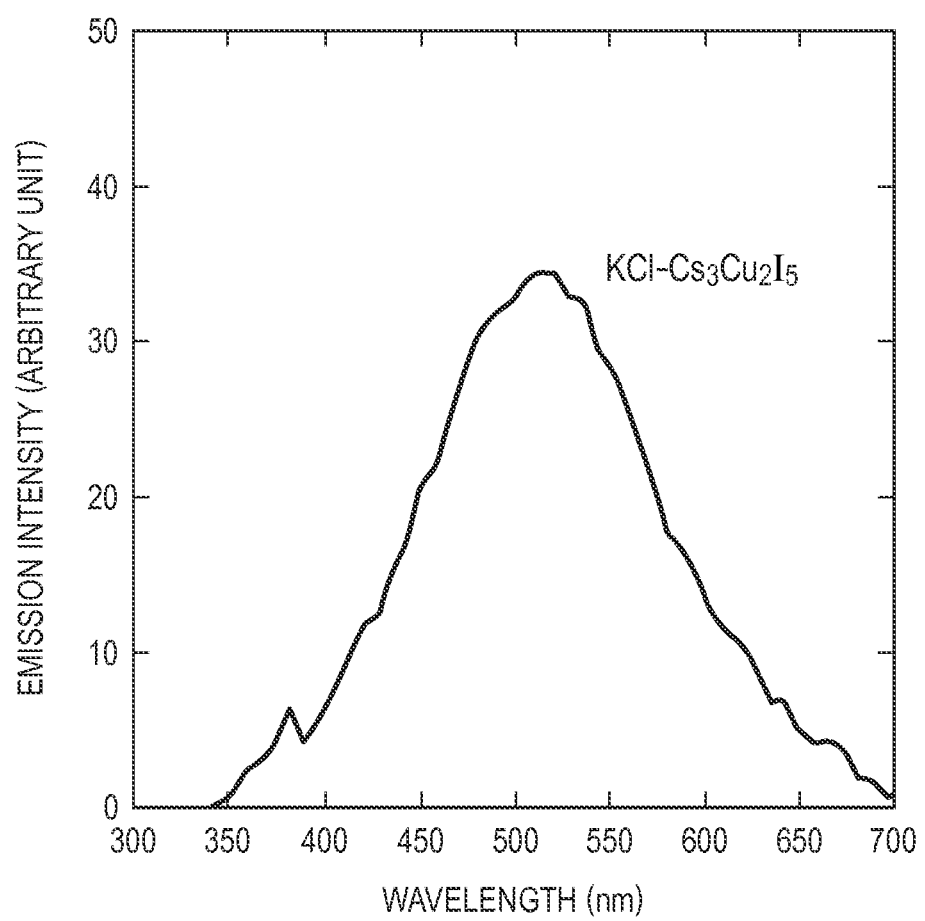
FIG. 4 is a graph showing an emission spectrum of a $Cs_3Cu_2I_5$—KCl system scintillator.

FIG. 4 shows the result of measurement of an emission spectrum of a $Cs_3Cu_2I_5$—KCl system sample selected from the above-mentioned manufactured samples, which was excited by X-rays applied thereto. The emission intensity in this case depends on the shape of the sample and the like, and thus, does not specify specific values. The $Cs_3Cu_2I_5$—KCl system exhibited an emission spectrum having its peak at about 510 nm, and it was made clear that the material system functioned as a scintillator. The $Cs_3Cu_2I_5$—NaBr system, the $Cs_3Cu_2I_5$—NaCl system, and the $Cs_3Cu_2I_5$—NaI system exhibited emission spectra having their peaks at about 490 nm to 510 nm, and it was made clear that, similarly to the $Cs_3Cu_2I_5$—KCl system, the material systems functioned as a scintillator.

As described above, it was made clear that the scintillator including $Cs_3Cu_2I_5$ in the second crystal phase according to the present invention functioned as the structure.

Example 2

Similarly to Example 1, this example relates to manufacture of the scintillator according to the present invention.

First, powder mixtures including 50 mol % of KBr, 27 mol % of NaBr, and 56 mol % of RbBr, respectively, with reference to $Cs_3Cu_2Br_5$ were prepared. Each of the powder mixtures was enclosed in a vacuum quartz tube to be a sample. Then, the samples were introduced into a Bridgman furnace as illustrated in the schematic view of FIG. 2A, and the temperature was raised to 800° C. After the samples were entirely molten, the state was held for 30 minutes. Then, the respective samples were pulled down to carry out the solidification gradually from the bottom of the samples. Further, the samples were caused to enter a region of the furnace in which cooling water circulated when the samples were pulled down, and thus, the temperature gradient from the molten portion was caused to be 30° C./mm or larger. The three kinds of samples which were manufactured in this way were cut, and the structures thereof were observed under a transmitted light optical microscope. The result was as follows. The structure of a surface perpendicular to the direction of solidification of the $Cs_3Cu_2Br_5$—KBr system was satisfactory as shown in FIG. 3E. Similarly, the structures of surfaces perpendicular to the direction of solidification of $Cs_3Cu_2Br_5$—NaBr and $Cs_3Cu_2Br_5$—RbBr systems were satisfactory as illustrated in FIGS. 3F and 3G, respectively.

These samples were also observed under a scanning electron microscope (SEM). It was confirmed that the columnar crystals extended long in a direction parallel to the direction of solidification. Further, composition analysis attached to the SEM made it clear that the columnar crystals in the samples were formed of KBr, NaBr and RbBr, respectively, which were surrounded by $Cs_3Cu_2Br_5$. In this way, it was confirmed that a structure in which a large number of columnar crystals had unidirectionality and the large number of columnar crystals were surrounded by $Cs_3Cu_2Br_5$ may be formed. Further, FIGS. 3A to 3L show images using transmitted light, and thus, the region of $Cs_3Cu_2Br_5$ of the high refractive index medium was observed to be brighter, and it was confirmed that optical waveguiding was achieved as expected.

In these three kinds of samples, with regard to the volume ratio of the columnar crystals to the $Cs_3Cu_2Br_5$ portion, the volume ratio of KBr of the $Cs_3Cu_2Br_5$—KBr system was about 20 vol %, the volume ratio of NaBr of the $Cs_3Cu_2Br_5$—NaBr system was about 9 vol %, and the volume ratio of RbBr of the $Cs_3Cu_2Br_5$—RbBr system was about 40 vol %. It was made clear that, in this way, the volume ratio varies depending on the material systems. From the viewpoint of optical waveguiding, material systems including RbBr or KBr having a high volume ratio are more preferred. However, the effect of the volume ratio is adverse from the viewpoint of absorbing X-rays. The above-mentioned preference is only from the viewpoint of optical waveguiding, and suitable material systems may be selected appropriately depending on the application.

Emission spectra of the above-mentioned manufactured three kinds of samples of the $Cs_3Cu_2Br_5$—KBr, $Cs_3Cu_2Br_5$—NaBr, and $Cs_3Cu_2Br_5$—RbBr systems, which were excited by X-rays applied thereto, were measured similarly to the case of Example 1. It was made clear that all of the material systems functioned as the scintillator.

As described above, it was made clear that the scintillator including $Cs_3Cu_2Br_5$ in the second crystal phase according to the present invention functioned as the structure.

Example 3

Similarly to Examples 1 and 2, this example relates to manufacture of the scintillator according to the present invention.

Figures 3H, 3I:
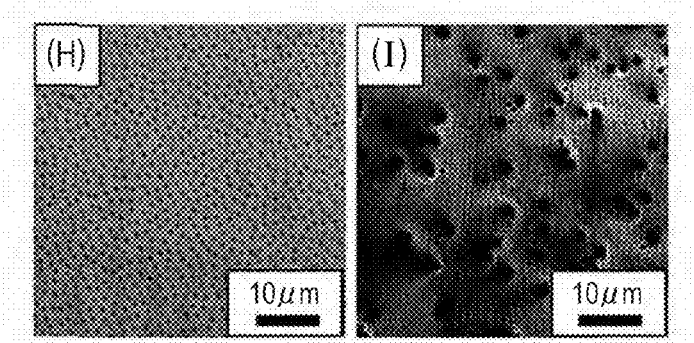

First, powder mixtures including 36 mol % of KBr and 65 mol % of NaBr, respectively, with reference to $Cs_3Cu_2Br_{2.5}I_{2.5}$ were prepared. Each of the powder mixtures was enclosed in a vacuum quartz tube to be a sample. Then, the samples were introduced into a Bridgman furnace as illustrated in the schematic view of FIG. 2A, and the temperature was raised to 800° C. After the samples were entirely molten, the state was held for 30 minutes. Then, the respective samples were pulled down to carry out the solidification gradually from the bottom of the samples. Further, the samples were caused to enter a region of the furnace in which cooling water circulated when the samples were pulled down, and thus, the temperature gradient from the molten portion was caused to be 30° C./mm or larger. The two kinds of samples which were manufactured in this way were cut, and the structures thereof were observed under a transmitted light optical microscope. The result was as follows. The structure of a surface perpendicular to the direction of solidification of the $Cs_3Cu_2Br_{2.5}I_{2.5}$—KBr system was satisfactory as shown in FIG. 3H. Similarly, the structure of a surface perpendicular to the direction of solidification of the $Cs_3Cu_2Br_{2.5}I_{2.5}$—NaBr system was satisfactory as shown in FIG. 3I.

These samples were also observed under a scanning electron microscope (SEM). It was confirmed that the columnar crystals extended long in a direction parallel to the direction of solidification. Further, composition analysis attached to the SEM made it clear that the columnar crystals in the samples were formed of KBr and NaBr, respectively, which were surrounded by $Cs_3Cu_2Br_{2.5}I_{2.5}$. In this way, it was confirmed that a structure in which a large number of columnar crystals had unidirectionality and the large number of columnar crystals were surrounded by $Cs_3Cu_2Br_{2.5}I_{2.5}$ may be formed. Further, FIGS. 3A to 3L show images using transmitted light, and thus, the region of $Cs_3Cu_2Br_{2.5}I_{2.5}$ of the high refractive index medium was observed to be brighter, and it was confirmed that optical waveguiding was achieved as expected.

In these two kinds of samples, with regard to the volume ratio of the columnar crystals to the $Cs_3Cu_2Br_{2.5}I_{2.5}$ portion, the volume ratio of KBr of the $Cs_3Cu_2Br_{2.5}I_{2.5}$—KBr system was about 12 vol %, and the volume ratio of NaBr of the $Cs_3Cu_2Br_{2.5}I_{2.5}$—NaBr system was about 38 vol %. It was made clear that, in this way, the volume ratio varies depending on the material systems. From the viewpoint of optical waveguiding, a material system including NaBr having a high volume ratio is more preferred. However, the effect of the volume ratio is adverse from the viewpoint of absorbing X-rays. The above-mentioned preference is only from the viewpoint of optical waveguiding, and suitable material systems may be selected appropriately depending on the application.

Emission spectra of the above-mentioned manufactured two kinds of samples of the $Cs_3Cu_2Br_{2.5}I_{2.5}$—KBr and $Cs_3Cu_2Br_{2.5}I_{2.5}$—NaBr systems, which were excited by X-rays applied thereto, were measured similarly to the case of Examples 1 and 2. It was made clear that all of the material systems functioned as the scintillator.

As described above, it was made clear that the scintillator including $Cs_3Cu_2Br_{2.5}I_{2.5}$ in the second crystal phase according to the present invention functioned as the structure.

Example 4

Similarly to Examples 1 to 3, this example relates to manufacture of the scintillator according to the present invention.

Figures 3J, 3K, 3L:
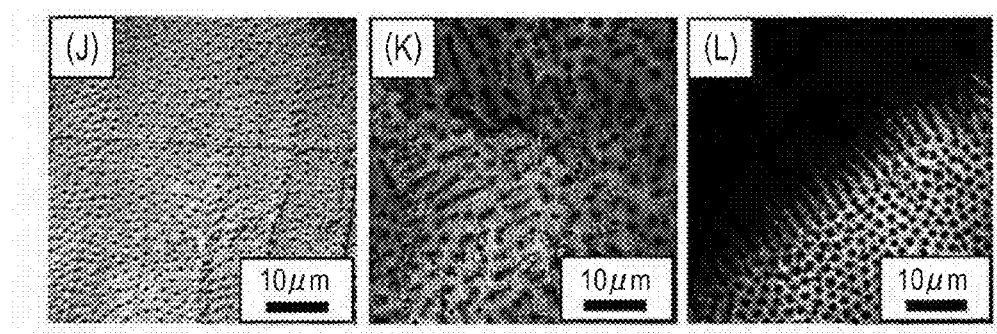

First, powder mixtures including 30 mol % of KCl and 17 mol % of NaCl, respectively, with reference to $Cs_3Cu_2Cl_{3.75}I_{1.25}$ were prepared. Each of the powder mixtures was enclosed in a vacuum quartz tube to be a sample. Then, the samples were introduced into a Bridgman furnace as illustrated in the schematic view of FIG. 2A, and the temperature was raised to 800° C. After the samples were entirely molten, the state was held for 30 minutes. Then, the respective samples were pulled down to carry out the solidification gradually from the bottom of the samples. Further, the samples were caused to enter a region of the furnace in which cooling water circulated when the samples were pulled down, and thus, the temperature gradient from the molten portion was caused to be 30° C./mm or larger. The two kinds of samples which were manufactured in this way were cut, and the structures thereof were observed under a transmitted light optical microscope. The result was as follows. The structure of a surface perpendicular to the direction of solidification of the $Cs_3Cu_2Cl_{3.75}I_{1.25}$—KCl system was satisfactory as shown in FIG. 3J. Similarly, the structure of a surface perpendicular to the direction of solidification of the $Cs_3Cu_2Cl_{3.75}I_{1.25}$—NaCl system was satisfactory as shown in FIG. 3K.

These samples were also observed under a scanning electron microscope (SEM). It was confirmed that the columnar crystals extended long in a direction parallel to the direction of solidification. Further, composition analysis attached to the SEM made it clear that the columnar crystals in the samples were formed of KCl and NaCl, respectively, which were surrounded by $Cs_3Cu_2Cl_{3.75}I_{1.25}$. In this way, it was confirmed that a structure in which a large number of columnar crystals had unidirectionality and the large number of columnar crystals were surrounded by $Cs_3Cu_2Cl_{3.75}I_{1.25}$ may be formed. Further, FIGS. 3A to 3L show images using transmitted light, and thus, the region of $Cs_3Cu_2Cl_{3.25}I_{1.25}$ of the high refractive index medium was observed to be brighter, and it was confirmed that optical waveguiding was achieved as expected.

In these two kinds of samples, with regard to the volume ratio of the columnar crystals to the $Cs_3Cu_2Cl_{3.75}I_{1.25}$ portion, the volume ratio of KCl of the $Cs_3Cu_2Cl_{3.75}I_{1.25}$—KCl system was about 12 vol %, and the volume ratio of NaCl of the $Cs_3Cu_2Cl_{3.75}I_{1.25}$—NaCl system was about 8 vol %. It was made clear that, in this way, the volume ratio varies depending on the material systems. From the viewpoint of optical waveguiding, the material system including KCl having a high volume ratio is more preferred. However, the effect of the volume ratio is adverse from the viewpoint of absorbing X-rays. The above-mentioned preference is only from the viewpoint of optical waveguiding, and suitable material systems may be selected appropriately depending on the application.

Emission spectra of the above-mentioned manufactured two kinds of samples of the $Cs_3Cu_2Cl_{3.75}I_{1.25}$—KCl and $Cs_3Cu_2Cl_{3.75}I_{1.25}$—NaCl systems, which were excited by X-rays applied thereto, were measured similarly to the case of Examples 1 to 3. It was made clear that all of the material systems functioned as the scintillator.

As described above, it was made clear that the scintillator including $Cs_3Cu_2Cl_{3.75}I_{1.25}$ in the second crystal phase according to the present invention functioned as the structure.

Example 5

Similarly to Examples 1 to 4, this example relates to manufacture of the scintillator according to the present invention.

First, a powder mixture including 62 mol % of KBr with reference to $Cs_3Cu_2I_5$ was prepared. The powder mixture was enclosed in a vacuum quartz tube to be a sample. Then, the sample was introduced into a Bridgman furnace as illustrated in the schematic view of FIG. 2A, and the temperature was raised to 800° C. After the sample was entirely molten, the state was held for 30 minutes. Then, the sample was pulled down to carry out the solidification gradually from the bottom of the sample. Further, the sample was caused to enter a region of the furnace in which cooling water circulated when the sample was pulled down, and thus, the temperature gradient from the molten portion was caused to be 30° C./mm or larger. The sample manufactured in this way was cut, and the structure thereof was observed under a transmitted light optical microscope. The result was as follows. The structure of a surface perpendicular to the direction of solidification of the $Cs_3Cu_2I_5$—KBr system was satisfactory as shown in FIG. 3L.

The sample was also observed under a scanning electron microscope (SEM). It was confirmed that the columnar crystals extended long in a direction parallel to the direction of solidification. Further, composition analysis attached to the SEM made it clear that the columnar crystals in the sample were formed of KBr, which were surrounded by $Cs_3Cu_2I_5$. In this way, it was confirmed that a structure in which a large number of columnar crystals had unidirectionality and the large number of columnar crystals were surrounded by $Cs_3Cu_2I_5$ may be formed. Further, FIGS. 3A to 3L show images using transmitted light, and thus, the region of $Cs_3Cu_2I_5$ of the high refractive index medium was observed to be brighter, and it was confirmed that optical waveguiding was achieved as expected.

In the above-mentioned sample, with regard to the volume ratio of the columnar crystals to the $Cs_3Cu_2I_5$ portion, the volume ratio of KBr of the $Cs_3Cu_2I_5$—KBr system was about 35 vol %.

An emission spectrum of the above-mentioned manufactured sample of the $Cs_3Cu_2I_5$—KBr system, which was excited by X-rays applied thereto, was measured similarly to the case of Examples 1 to 4. It was made clear that the material system functioned as the scintillator.

As described above, it was made clear that the scintillator including $Cs_3Cu_2I_5$ in the second crystal phase according to the present invention functioned as the structure.

Example 6

Similarly to Examples 1 to 5, this example relates to manufacture of the scintillator according to the present invention.

Samples were manufactured by the above-mentioned manufacturing method using raw material powder mixtures with the value of the ratio "a" being changed so as to obtain $Cs_3C_2(Cl_aI_{1-a})_5$.

Table 5 shows the result of composition analysis and the appearance of the samples including $Cs_3C_2(Cl_aI_{1-a})_5$. From Table 5, it may be confirmed that transparent crystals are obtained when the molar fraction of Cl in the sum of I and Cl which are halogen elements is in the range of 0.71 or more to 0.79 or less ($0.71 \leq a \leq 0.79$).

TABLE 5

| Sample | Molar Fraction Cl/(Cl + I) | Appearance |
|---|---|---|
| 1 | 0.60 | Opaque |
| 2 | 0.71 | Transparent |
| 3 | 0.72 | Transparent |
| 4 | 0.73 | Transparent |
| 5 | 0.74 | Transparent |
| 6 | 0.75 | Transparent |
| 7 | 0.76 | Transparent |
| 8 | 0.79 | Transparent |
| 9 | 0.80 | Opaque |

As described above, through formation of the phase separation structure in a material represented by $Cs_3Cu_2(Cl_{1-a}I_{1-a})_5$, where $0.71 \leq a \leq 0.79$ is satisfied, the material may be used as a more preferred scintillator. Of course, even when the appearance is opaque, a certain level of effect may be expected.

Example 7

This example relates to a radiation detector using the scintillator described in Examples 1, 2, 3, 4, 5, or 6.

Figure 6:
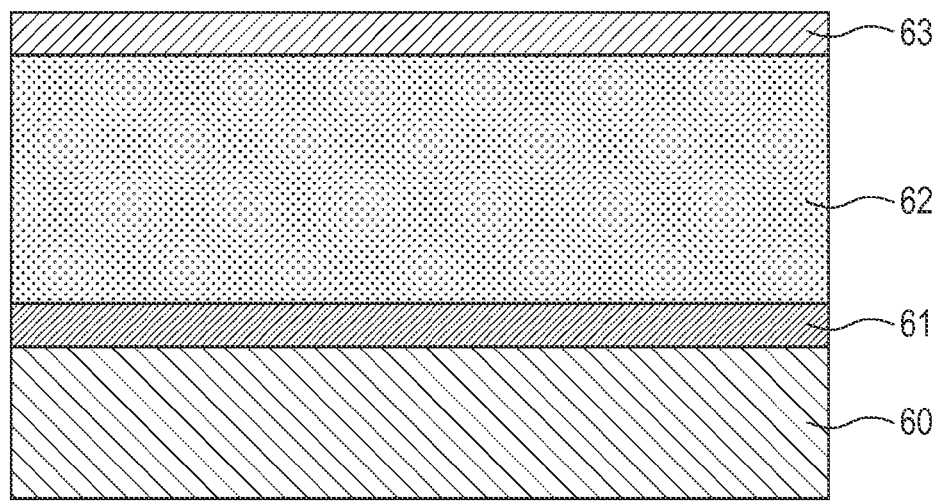
FIG. 6 illustrates an exemplary radiation detector using the scintillator according to the present invention.
Figure 7:
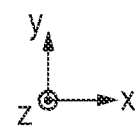
FIG. 7 illustrates a conventional scintillator.
Figure 7:
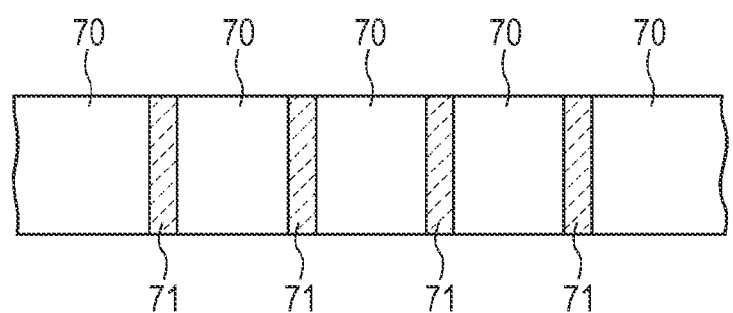

First, a photodetector 61 was placed on a substrate 60. Then, a Cs$_3$Cu$_2$I$_5$—KCl system scintillator 62 according to the present invention which was cut so as to have a thickness of 1 mm was placed on the photodetector so that the columnar crystals were substantially perpendicular, to thereby form the radiation detector (FIG. 6). Note that, in FIG. 6, a protective layer 63 is provided on the scintillator. It was confirmed from output of the photodetector that, when X-rays were applied to the scintillator of the radiation detector, dispersion of light was suppressed compared with a case of applying X-rays to a single crystal without partition walls, in which light was diffused in and propagated through the crystal face. Further, it was confirmed that, even when the scintillator and the photodetector were joined with resin, a state in which dispersion of light was suppressed was held, and it was made clear that, even when a layer of another material such as a protective layer was provided between the scintillator according to the present invention and the photodetector, a radiation detector may be formed.

Example 8

Figure 5A:
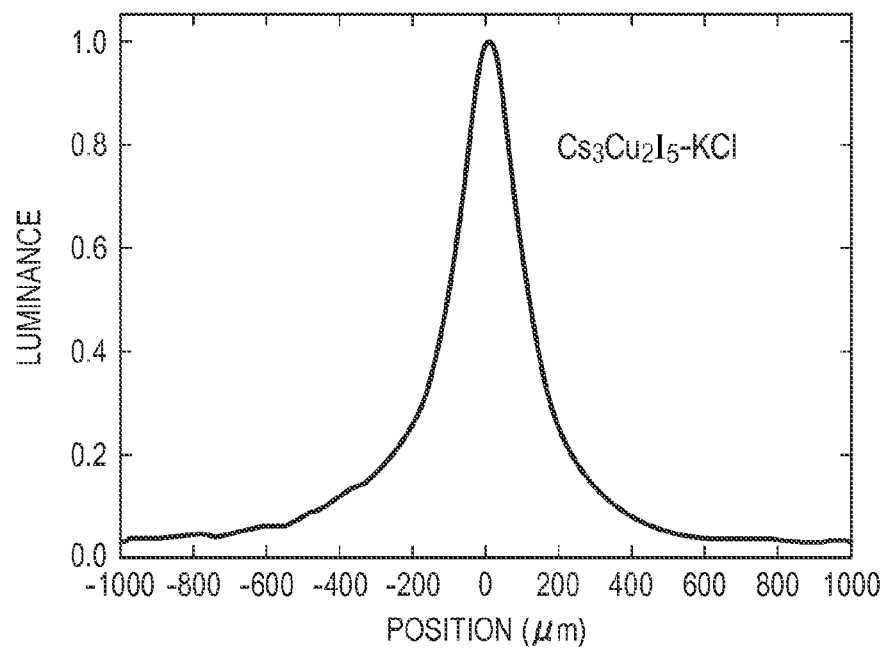
FIGS. 5A and 5B are graphs each showing a waveguide property of the scintillator according to the present invention.
Figure 5B:
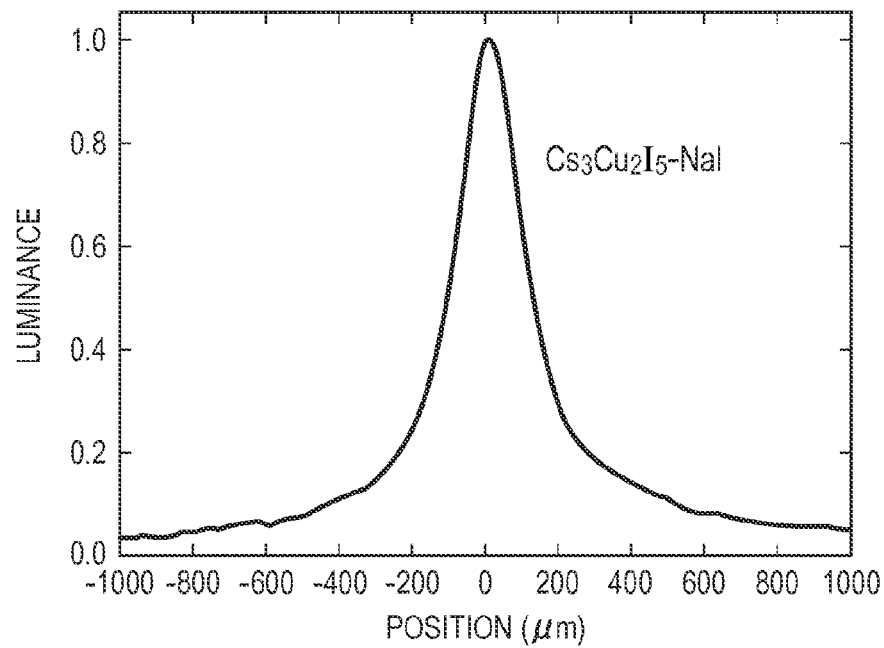

In this case, with regard to the optical waveguide performance of the Cs$_3$Cu$_2$I$_5$ systems, propagating characteristics of emitted light was evaluated compared with a Tl-doped CsI needle crystal film which is generally said to use its optical waveguide function. The thickness of the Cs$_3$Cu$_2$I$_5$—KCl system was 1 mm as described above, while the thickness of the CsI needle crystal film as the comparative example was 430 μm. As the source of X-rays, a tungsten light bulb was used. X-rays obtained under the conditions of 60 kV, 1 mA, and without an Al filter were applied to samples through an opening of φ100 μm in a tungsten plate having a thickness of 2 mm, and the light intensity distribution at the bottom surface of the samples was measured using CCDs with 50-μm pitches. Each of FIGS. 5A and 5B shows an intensity profile of a section passing through a peak value of the distribution. In FIGS. 5A and 5B, the peak luminance was standardized and the half-width was calculated. While the half-width of the CsI needle crystal film having a relatively small thickness was 340 μm, the half-width of the Cs$_3$Cu$_2$I$_5$—KCl system was 223 μm (FIG. 5A). The half-width of a Cs$_3$Cu$_2$I$_5$—NaI system was 235 μm (FIG. 5B). It was made clear that, from this result, the Cs$_3$Cu$_2$I$_5$—KCl and Cs$_3$Cu$_2$I$_5$—NaI systems according to the present invention exhibited satisfactory phase separation structures, and waveguiding of light to a light receiving surface is effectively achieved with less scattering of light at the time of the waveguiding.

As described above, it was confirmed that a scintillator including Cs$_3$Cu$_2$I$_5$ in the second crystal phase according to the present invention had an optical waveguide function.

Further, it was confirmed that a scintillator including Cs$_3$Cu$_2$Br$_5$, Cs$_3$Cu$_2$Br$_{2.5}$I$_{2.5}$, or Cs$_3$Cu$_2$Cl$_{3.75}$I$_{1.25}$ in the second crystal phase according to the present invention had an optical waveguide function.

A scintillator according to the present invention emits light when radiation is applied thereto, and has an waveguide property of the emitted light, and thus, is useful as a radiation detector when used in combination with a photodetector without forming conventional partition walls. In particular, the scintillator may be used in a measurement apparatus for medical care, for industrial use, for high-energy physics, and for space use using radiation such as X-rays.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A scintillator comprising a phase separation structure, the phase separation structure comprising:
   a first crystal including multiple columnar crystals having unidirectionality; and
   a second crystal located at a side of the first crystal phase,
   wherein the second crystal includes Cs, Cu, and at least one element selected from the group consisting of I, Br, and Cl, and
   wherein the second crystal emits light when being excited by radiation.

2. The scintillator according to claim 1, wherein the second crystal includes one or two elements selected the group consisting of I, Br, and Cl.

3. The scintillator according to claim 2, wherein a composition of the scintillator is a composition at a eutectic point.

4. The scintillator according to claim 2, wherein, in the phase separation structure, a period between adjacent columnar crystals is from 500 nm to 50 μm.

5. A radiation detector, comprising:
   the scintillator according to claim 2; and
   a photodetector,
   wherein the scintillator is placed on the photodetector directly or with a film or a layer therebetween.

6. The scintillator according to claim 1, wherein a composition ratio of the second crystal is represented by Cs:Cu:X:Y=3:2:5a:5-5a,
   wherein the X and Y are elements different from each other and are selected from the group consisting of I, Br, and Cl, and
   wherein 0≤a≤1 is satisfied.

7. The scintillator according to claim 6, wherein X is Br, Y is I, and 0≤a≤1 is satisfied.

8. The scintillator according to claim 6, wherein X is Cl, Y is I, and 0.71≤a≤0.79 is satisfied.

9. The scintillator according to claim 1, wherein the first crystal includes any one of NaCl, NaBr, NaI, KCl, KBr, and RbBr.

10. The scintillator according to claim 9, wherein the first crystal includes any one of NaBr, KBr, and RbBr.

11. The scintillator according to claim 9, wherein the first crystal includes any one of NaCl and KCl.

12. The scintillator according to claim 1, wherein the second crystal includes Cs, Cu, and I.

13. The scintillator according to claim 12, wherein a composition ratio of the second crystal is represented by Cs:Cu:I=3:2:5.

14. The scintillator according to claim 13, wherein the first crystal includes any one of NaCl, NaBr, NaI, KCl, and KBr.

15. The scintillator according to claim 1, wherein the second crystal includes Cs, Cu, and Br.

16. The scintillator according to claim 1, wherein a composition of the scintillator is a composition at a eutectic point.

17. The scintillator according to claim 1, wherein, in the phase separation structure, a period between adjacent columnar crystals is from 500 nm to 50 μm.

18. A radiation detector, comprising:
   the scintillator according to claim 1; and
   a photodetector,
   wherein the scintillator is placed on the photodetector directly or with a film or a layer therebetween.

* * * * *